United States Patent [19]
Lake

[11] Patent Number: 5,977,200
[45] Date of Patent: Nov. 2, 1999

[54] UV CURABLE CLEARCOAT COMPOSITIONS AND PROCESS

[75] Inventor: Randall T. Lake, Newburgh, Ind.

[73] Assignee: Red Spot Paint & Varnish Co., Inc., Evansville, Ind.

[21] Appl. No.: 08/486,356

[22] Filed: Jun. 7, 1995

Related U.S. Application Data

[62] Division of application No. 08/425,730, Apr. 20, 1995, which is a continuation of application No. 08/079,967, Jun. 18, 1993, abandoned, which is a continuation of application No. 07/934,295, Aug. 24, 1992, abandoned, which is a continuation of application No. 07/679,923, Apr. 3, 1991, abandoned.

[51] Int. Cl.$^6$ ................ G02B 1/10; C08J 7/04; C08F 2/50
[52] U.S. Cl. ................ 522/75; 522/79; 522/80; 522/78; 522/96; 522/97; 427/512; 427/516; 427/517; 427/519; 359/581; 359/582; 359/900
[58] Field of Search .................... 522/78, 79, 80, 522/75, 96, 97, 90; 427/512, 516, 517, 519; 359/581, 582, 900

[56] References Cited

U.S. PATENT DOCUMENTS

| | | | |
|---|---|---|---|
| 4,287,323 | 9/1981 | Tefertiller et al. | 522/96 |
| 4,511,596 | 4/1985 | Berner | 522/96 |
| 4,929,506 | 5/1990 | Kerr, III et al. | 428/412 |
| 5,571,570 | 11/1996 | Lake | 427/494 |

*Primary Examiner*—Susan W. Berman
*Attorney, Agent, or Firm*—Woodard, Emhardt, Naughton Moriarty & McNett

[57] ABSTRACT

An ultraviolet curable clearcoat composition comprising (exclusive of any solvent present): (a) about 30% to about 90% by weight of an acrylated aliphatic urethane having a molecular weight of about 1200 to 2600 and formed by the reaction of a multifunctional acrylate with a molecular weight of between about 110 and about 500 with an aliphatic urethane based on a polyether and having a molecular weight of about 800 to about 2200; (b) about 15% to about 70% by weight of a multifunctional acrylate having a molecular weight of about 170 to about 1000 and containing at least two polymerizable unsaturated groups per molecule; and (c) a photopolymerization initiator and/or sensitizer. Also described are preferred processes and clearcoated articles involving preferred clearcoat compositions.

13 Claims, No Drawings

UV CURABLE CLEARCOAT COMPOSITIONS AND PROCESS

This application is a division of application Ser. No. 08/425,730, filed Apr. 20, 1995 which is a continuation of application Ser. No. 08/079,967, filed Jun. 18, 1993, now abandoned, which is a continuation of application Ser. No. 07/934,295, filed Aug. 24, 1992, now abandoned, which is a continuation of application Ser. No. 07/679,923, filed Apr. 3, 1991, now abandoned.

BACKGROUND OF THE INVENTION

This invention relates generally to ultraviolet (UV) cured coatings, and more particularly to UV clearcoat coatings which have demonstrated-high flexibility as well as other properties excellently suited for overlay compositions, to processes of their use, and to coated articles resulting therefrom.

By way of background, conventionally cured clearcoat overlays have several disadvantages. In general, the clearcoat and the curing agent are applied separately, in a particular sequence and at particular concentration levels. Because both the proportions of the ingredients and the timing of their application is critical, conventionally cured clearcoat overlays have been difficult and costly to apply, especially with the efficiency and consistency required in modern commercial applications.

Ultraviolet (UV) cured clearcoat coatings overcome several disadvantages associated with conventional clearcoat finishes. In particular, UV cured clearcoat coatings may be premixed so that the polymerization initiator is added to the active ingredients by the manufacturer when the coating is produced, and not by the coating user when the coating is to be applied. Thus, mixing and measurement errors can be avoided and a more consistent product can be obtained.

Despite their many advantages, UV curable clearcoat coating compositions pose problems which must be addressed. For example, typical UV clearcoats are high molecular weight, highly crosslinked films formed from highly reactive acrylate functionality. As such, known UV clearcoats have suffered from limited durability, have been prone to cured resin shrinkage, and have required high doses of UV light to cure. UV clearcoats formulated to overcome these problems typically suffer from a loss of durability or processibility, including diminished scratch resistance, abrasion resistance, weather resistance, chemical resistance, stain resistance, thermal stability and adhesion.

Also, importantly, known UV clearcoats upon curing have long proven to form rigid, unflexible and unyieldable coatings. Thus, problems have been experienced in the industry where clearcoats overlay materials which are prone to expansion or contraction during processing or in the field of use. For example, UV clearcoats overlaying dark, e.g. black finishes which expand upon heating have been known to crack, form other imperfections, or even cause bending or warping of the substrate due to tensions built up in the materials.

In light of the foregoing, a need exists for a UV curable clearcoat composition which is conveniently processible and which forms coatings exhibiting improved physical and chemical properties, e.g., improved flexibility, durability, thermal stability, crack resistance, chemical resistance, stain resistance, weather resistance and adhesion.

SUMMARY OF THE INVENTION

The applicant's invention now addresses these needs and provides in one preferred embodiment a UV curable clearcoat composition. This composition comprises: (a) about 30% to about 85% by weight of an acrylated aliphatic urethane having a molecular weight of about 1200 to about 2600 and formed by the reaction of a multifunctional acrylate with a molecular weight of about 110 to about 500 with an aliphatic urethane based on a polyether and having a molecular weight of about 800 to about 2200; (b) about 15% to about 70% by weight of a multifunctional acrylate having a molecular weight of between about 170 and about 1000 and containing at least two polymerizable unsaturated groups per molecule; and (c) a photopolymerization initiator and/or sensitizer. The composition can also optionally include a solvent. Unless otherwise specified, percents by weight set forth in this application are calculated exclusive of any solvent present. More preferred compositions can also include suitable light stabilizing agents, e.g., hindered amine and/or benzotriazole derivatives.

Additional preferred embodiments of the invention relate to coated articles and coating processes resulting from and involving the use of applicant's preferred clearcoat compositions.

One object of the invention is to provide improved ultraviolet curable clearcoat compositions demonstrating superior chemical and physical properties such as improved flexibility, durability, thermal stability, crack resistance, chemical resistance, stain resistance, weather resistance and adhesion.

Another object of the invention is to provide processes for coating or overlaying articles, e.g. coated, e.g. painted, or uncoated plastic or metal parts, so as to improve their physical and chemical properties.

Still another object of the present invention is to provide a coated or overlaid article exhibiting superior physical and chemical properties, and especially wherein the clearcoat is flexible and resists cracking or other significant deterioration, upon expansion of the article or another coating underlaying the clearcoat.

Another object of this invention is to provide coating processes and compositions which enable convenient and consistent, uniform processibility.

Further objects and advantages of the present invention will be apparent from the following description and appended claims.

DESCRIPTION OF THE PREFERRED EMBODIMENT

For the purposes of promoting an understanding of the principles of the invention, reference will now be made to certain embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, one preferred embodiment of this invention relates to a UV curable clearcoat composition. In this regard, Formula I, set forth below, shows starting materials and compositional ranges for preferred clearcoat compositions of the invention. The compositional ranges are given as a percent by weight of the composition excluding any solvent which is included.

| Formula I: | |
|---|---|
| Acrylated aliphatic urethane | (30–85%) |
| Multifunctional acrylate | (15–70%) |
| Photopolymerization initiator/sensitizer | (1–15%) |
| Hindered amine light stabilizer | (0.1–5%) |
| Hydroxy phenyl benzotriazole | (0.1–5%) |
| Flow additive | (0.1–5%) |

The acrylated aliphatic urethanes according to the present invention contain about 5% to 95% by weight of prereacted multifunctional acrylate and the balance in an aliphatic urethane. Particularly, to obtain the acrylated aliphatic urethanes, a multi-functional acrylate having a molecular weight of between about 110 and about 500 (e.g., 1,6 hexanediol diacrylate, hydroxy ethyl acrylate, and trimethylolpropane triacrylate) is prereacted with an aliphatic urethane based on a polyether and having a molecular weight of about 800 to about 2200 to provide an acrylated aliphatic urethane having a final molecular weight of about 1200 to about.2600. Acrylated aliphatic urethanes having molecular weights of about 1500 to about 2000 are more preferred, with those having a molecular weight of about 1800 being most preferred to date. These preferred acrylated aliphatic urethanes provide coatings of good weather and thermal crack resistance and as well excellent flexibility. Further, these acrylated aliphatic urethanes provide advantageous application solids, curing rates and material compatibility.

Commercially available acrylated aliphatic urethanes may be used. For example, "AB 2010", available from American Biltrite of Lawrenceville, N.J., has been a highly preferred acrylated aliphatic urethane in work to date.

Exclusive of any solvent, as indicated above, the acrylated aliphatic urethane constitutes about 30% to about 85% by weight of the composition. More preferably, this acrylated aliphatic urethane makes up about 40% to about 90% of the composition, most preferably about 40% to about 50%. These preferred levels have provided good thermal and crack resistance, as well as advantageous viscosity, material capacity and cure rates.

As will be understood, the particular multifunctional acrylate employed in Formula I will depend upon the desired application viscosity and properties. Typical multifunctional acrylates are of the reactive diluent type, have a molecular weight of about 170 to about 1000, and contain at least two polymerizable unsaturated groups per molecule. Representative multifunctional acrylates thus include ethylene glycol di(meth)acrylate, 1,6-hexanediol diacrylate, pentaerythritol triacrylate, pentaerythritol tetra acrylate, trimethylolpropane triacrylate, tetraethleneglycol diacrylate, and the like, and mixtures thereof, with light-stable materials, e.g. 1,6-hexanediol diacrylate, being more preferred.

The preferred coating composition includes this multifunctional acrylate in an amount of about 15% to about 70% by weight, with the range of about 15% to about 50% being more preferred. These preferred levels provide compositions of good compatibility which give coatings of excellent thermal crack resistance.

As those practiced in these areas will appreciate, many photopolymerization initiators will be suitable for the invention. These include, for instance, benzophenone, benzion, benzionmethyl ether, benzion-n-butyl ether, benzion-isobutyl ether, propiophenone, acetophenone, methyphenylgloxylate, 1-hydroxycyclohexyl phenyl ketone, 2,2-diethoxyacetophenone, ethlphenylpyloxylate, phenanthraquinone, and the like, and mixtures thereof. In work thus far, 1-hydroxycyclohexyl phenyl ketone has been more preferred.

The photopolymerization initiator and/or sensitizer will be included in an amount sufficient to obtain the desired cure response. In preferred compositions of the invention, the photopolymerization initiator is included in amounts of about 1% to about 15% by weight. The range of about 5% to about 10% is more preferred, with about 7% being most preferred so far. As indicated, however, the amount of initiator included will vary based upon many factors such as the cure rate and durability desired. For additional information on photopolymerization initiators and sensitizers, reference can be made to C. G. Roffey, *Photopolymerization of Surface Coatings*, Chapter 3: "Photo-initiators and photo-sensitizers", John Wiley & Sons Ltd (1982), which is hereby incorporated by reference.

The clearcoat composition also preferably includes other materials such as light stabilizers, e.g. suitable hindered amines and/or benzotriazole derivatives. These materials will be included in varying amounts in accordance with the particular use or application desired. When included, their amounts will be sufficient to provide increased weatherability yet still obtain adequate cure response for the composition. In more preferred compositions, hindered amine and hydroxyphenyl benzotriazole (or other suitable benzotriazole compound) have been included in amounts of about 0.3–4%, 0.3–4%, respectifully, and in particularly preferred compositions about 0.5%, 0.5%, respectively.

As stated, the coating composition also optionally includes a suitable inert solvent. Representative such solvents include ester solvents, e.g. ethyl acetate, butyl acetate, and the like, ketone solvents, e.g. acetone, methylisobutylketone, methylethylketone, and the like, alcohols, e.g. butyl alcohol, and the like, and aromatic solvents, e.g. toluene xylene, and the like. The amount of solvent included will vary in accordance with the particular application at hand. For instance, for spray applications, higher levels of solvent will typically be included, while for roll applications, lower levels of inert solvent, if any, will be employed. In any event, the inert solvent will constitute from 0% to about 95% by weight of the coating composition, and in more preferred coating compositions about 40% to 60%.

As will be understood, the clearcoat composition can also include other conventional additives. For instance, it can contain polymeric or silicone coating surface improvers, flow improvers, dyes, pigments, antioxidants, flatting agents (e.g. wax-coated or non-wax-coated silica or other inorganic materials), etc. In more preferred compositions, flow improver is included at a level of about 0.3–2%, and in one especially preferred composition, the flow improver Byk 301, available from BYK-CHEMIE, of Wallingford, Conn. has been included. Additionally, in another preferred composition, a silica flatting agent is included, desirably in amounts of about 5 to about 20% by weight. For instance, Example 5 below sets forth a preferred composition including a flatting agent and which is highly suitable for use on computer keyboards and other applications where frost coatings are desired.

As to its use, the clearcoat overlay composition can be applied by any conventional coating method as known in the art. For example the composition can be applied directly to the substrate or over another previously-cured (e.g. paints or primers) or uncured (e.g. in the case of tie coats) coating. The topcoat material is advantageously used at about 0.3 mils to about 3.0 mils of cured film thickness, with more preferred cured film thicknesses being those around about 1 mil. Preferred thicknesses will provide sufficient film continuity, avoid surface sagging, and promote a satisfactory cure.

Once applied, the coating composition can be cured by irradiation with ultraviolet rays as is known to those skilled in the art. In this regard, the irradiation is continued until curing is complete, with preferred exposure times typically being less than 300 seconds. Curing temperatures can range from room temperature to the heat distortion temperature of the substrate, while curing distances are typically between about 2 and 18 inches from the UV source.

An ultraviolet light source having a wavelength range of between about 1800 Angstroms and 4500 Angstroms is preferred for curing the topcoat. For example, sunlight, mercury lamps, arc lamps, zenon lamps, gallium lamps, and the like may be used, but high pressure or ultrahigh pressure mercury lamps provide particularly advantageous rapid cures.

A high pressure mercury lamp having an intensity of about 30 W/cm to 400 W/cm is preferred, for a total exposure of between about 300 and about 16000 mJ/cm$^2$ as measured by a compact radiometer at 60 to 1200 mW/cm$^2$ and about 75 to about 4000 mJ as measured by a UVIMAP, with a preferred exposure of about 3000 mJ/cm$^2$ as measured by a compact radiometer at 260 mW/cm$^2$ and about 700 mJ as measured by a UVIMAP. These preferred curing processes have provided good through cure, and have ensured advantageous coatings which resist premature yellowing and demonstrate desirable thermal crack resistance. Moreover, these advantageous cures have been achieved over a surprisingly wide range of exposures. Accordingly, the preferred compositions are readily and highly conveniently processible. Previously known UV curable compositions have demonstrated serious deficiencies in this regard, a problem long recognized in the industry leading to increased production costs and wastes of time and materials.

For the purposes of promoting a further understanding of the invention and its preferred features and advantages, reference will now be made to the following specific examples and tables. It will be understood that these examples and tables are given by way of illustration and are not intended to be restrictive of the invention.

EXAMPLE 1

Preparation of Preferred UV Curable Coating Composition

In order to prepare a UV curable coating composition in accordance with the invention, items 1 and 2 of Formula II below were charged into a clean stainless steel vessel equipped with a stirrer. Thereafter, ingredients 3 through 9 were added under agitation until a clear homogeneous mixture was obtained. This coating composition was called "Clearcoat A."

| Formula II: | | |
|---|---|---|
| | | Part by Weight |
| 1. | Isopropanol | 546.7 |
| 2. | Butanol | 28.8 |
| 3. | 1-Hydroxycyclohexyl phenyl ketone | 29.1 |
| 4. | Hindered amine light stabilizer | 2.0 |
| 5. | Benzotriazole | 2.0 |

-continued

| Formula II: | | |
|---|---|---|
| | | Part by Weight |
| 6. | Acrylated aliphatic urethane* | 172.6 |
| 7. | 1,6 Hexanediol diacrylate | 35.6 |
| 8. | Trimethylolpropane triacrylate | 172.6 |
| 9. | Flow improver (Byk 301) | 3.0 |

*"AB 2010," based on a polyether aliphatic urethane prereacted with a multifunctional acrylate.

EXAMPLE 2

Production of Topcoated Plastic Molded Article

An acrylic resin lens was underlaid in various areas with a black pigmented acrylic butyrate by screen printing to allow 12 microns of cured coating thickness. After drying, the above-described Clearcoat A was coated on the acrylic resin lens by spray to allow 25 microns of cured coating thickness and this was irradiated with a high pressure mercury lamp of 120 W/cm$^2$, with the substrate positioned eight inches from the light source for an exposure of 3000 mJ/cm$^2$ in air.

The thus obtained overlaid acrylic resin lens had a clear appearance. The product was evaluated by exterior decorative standards to obtain the excellent results shown in Table 1.

TABLE 1

| Evaluated Item | Evaluated Method | Result |
|---|---|---|
| Adhesion | Peel Test ASTM# D3359-83 | No los |
| Abrasion Resistance | Taber Abrader, CS-10, 500 g load, 300 cycles | Passable |
| Water Resistance | 32 degrees Centigrade, 240 hour immersion | Passable Second adhesion OK |
| Thermal Shock Resist. | 4 hrs. water immersion 4 hrs. −29° C. Steam blast on scribe | Passable |
| Heat Resistance | 80° C., 2 hrs. | No cracks |
| Resistance to Water & Soap Spotting | Discoloration | Passable |
| Resist. to Acid Spots | No dulling or color change | Passable |
| Chemical Resistance | Motor Oil, Tar remover Windshield Wiper Fluid Antifreeze, Motor Fuel | Passable |
| Weather Resistance | Weatherometer SAE J1960 750 hours | Passable |
| Weather Resistance | Florida exposure 12 months, 45 degrees South | Passable |

EXAMPLE 3

Comparative Coating Material

The overlay was prepared in the same manner as in Overlay A in Example 1 except the acrylated aliphatic urethane was replaced with one of a molecular weight of 800 and labeled "Clearcoat B."

EXAMPLE 4

Comparative Coated Article

Clearcoat B was applied and cured as was clearcoat A in Example 2. The resultant overlaid product was evaluated by the same conditions as in Example 2, and produced the following results:

TABLE 2

| Evaluated Item | Results of Evaluation |
| --- | --- |
| Adhesion | No loss |
| Abrasion Resistance | Acceptable |
| Water Resistance | Passable, Secondary adhesion OK |
| Thermal Shock Resistance | Passable |
| Heat Resistance | Unacceptable on underlay |
| Resistance to Water & Soap Spotting | Paasable |
| Resistance to Acid Spotting | Passable |
| Chemical Resistance | Passable |
| Weather Resistance | Cracking on underlay |

It was thus demonstrated that coating compositions including acrylated aliphatic urethanes having relatively low molecular weights provide less desirable coatings.

EXAMPLE 5

Frosted Clearcoat Composition

In this Example a frosted clearcoat composition was prepared according to formula III below. The flatting agent employed in this Example was Crossfield HP39 silica, silcon dioxide amorphous synthetic, available from Crossfield Chemicals, Inc. of Joliet, Ill.

Formula III

| | | Part by weight |
| --- | --- | --- |
| 1. | Isopropanol | 403.2 |
| 2. | Butanol | 92.7 |
| 3. | 1-Hydroxycyclohexyl phenyl ketone | 30.5 |
| 4. | Acrylated aliphatic urethane* | 179.5 |
| 5. | 1,6 Hexanediol diacrylate | 45.1 |
| 6. | Trimethylolpropane triacrylate | 179.5 |
| 7. | Flow improver (Byk 301) | 3.3 |
| 8. | Flatting agent | 66.2 |

*"AB 2010," based on a polyether aliphatic urethane prereacted with a multifunctional acrylate.

The resulting coating composition, applied to computer keyboards and the like and cured, provides a high quality frost coating.

What is claimed is:

1. A method for manufacturing a clear lens having a clear, abrasion-resistant, exterior-durable clearcoat thereon, comprising the steps of:
    (a) spraying an ultraviolet curable coating composition onto the lens in sufficient amount to provide a cured film thickness of about 0.3 to 3 mils, said coating composition including:
        (i) an inert organic solvent;
        (ii) exclusive of said inert organic solvent, about 30% to about 85% by weight of an acrylated aliphatic urethane having a number average molecular weight of between about 1200 and 2600 and formed by the reaction of a multifunctional acrylate having a molecular weight of about 110 to about 500 with an aliphatic urethane based on a polyether and having a molecular weight of about 800 to about 2200;
        (iii) exclusive of said inert organic solvent, about 15% to about 70% by weight of one or more multifunctional acrylates having a molecular weight of about 170 to about 1000 and containing at least two polymerizable acrylate groups per molecule, said one or more multifunctional acrylates including an acrylate containing at least three polymerizable acrylate groups per molecule;
        (iv) a light stabilizer; and
        (v) a photopolymerization initiator or sensitizer; and
    (b) irradiating and thereby curing the ultraviolet curable coating composition with ultraviolet light, so as to form a clear, abrasion-resistant, exterior-durable clearcoat on said lens, said clearcoat having a cured film thickness of about 0.3 to 3 mils.

2. A method according to claim 1 wherein said ultraviolet curable composition comprises a hindered amine and a benzotriazole light stabilizer.

3. A method according to claim 2 wherein said benzotriazole light stabilizer is hydroxy phenyl benzotriazole.

4. A method according to claim 3 wherein:
    exclusive of said solvent, said curable composition is comprised about 40% to about 85% by weight of said acrylated aliphatic urethane, and about 15% to about 50% by weight of said one or more multifunctional acrylates.

5. A method according to claim 4, wherein said acrylated aliphatic urethane has a number average molecular weight of about 1500 to about 2000.

6. The method of claim 1, wherein said acrylated aliphatic urethane has a number average molecular weight of about 1500 to about 2000.

7. The method of claim 6, wherein said multifunctional acrylate having a molecular weight of about 110 to about 500 is hydroxyethyl acrylate.

8. The method of claim 1, wherein exclusive of said inert organic solvent, said ultraviolet curable composition is comprised about 40% to about 50% of said acrylated aliphatic urethane.

9. The method of claim 1, wherein said one or more multifunctional acrylates includes a triacrylate or a tetraacrylate.

10. The method of claim 9, wherein said one or more multifunctional acrylates includes a member selected from the group consisting of pentaerythritol triacrylate, pentaerythritol tetraacrylate, and trimethylolpropane triacrylate.

11. The method of claim 1, wherein said inert organic solvent includes an ester solvent, a ketone solvent, or an aromatic solvent.

12. The method of claim 1, wherein said inert organic solvent constitutes about 40% to about 60% by weight of said ultraviolet curable composition.

13. The method of claim 1, wherein said multifunctional acrylate having a molecular weight of about 110 to about 500 is hydroxyethyl acrylate.

* * * * *